United States Patent
Kim et al.

(10) Patent No.: US 12,302,889 B2
(45) Date of Patent: May 20, 2025

(54) MOSQUITO REPELLENT APPARATUS AND METHOD FOR OPERATING THE SAME

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/388,106

(22) Filed: Nov. 8, 2023

(65) Prior Publication Data

US 2025/0031685 A1    Jan. 30, 2025

(30) Foreign Application Priority Data

Jul. 25, 2023 (KR) .......................... 10-2023-0097010

(51) Int. Cl.
*A01M 29/18* (2011.01)
*H05B 47/115* (2020.01)

(52) U.S. Cl.
CPC .......... *A01M 29/18* (2013.01); *H05B 47/115* (2020.01)

(58) Field of Classification Search
CPC .............................. A01M 29/16; A01M 29/18
See application file for complete search history.

(56) References Cited

U.S. PATENT DOCUMENTS

| | | | |
|---|---|---|---|
| 5,990,783 A * | 11/1999 | Feng | A01M 29/18 340/384.2 |
| 6,570,494 B1 * | 5/2003 | Leftridge, Sr. | A01M 29/18 43/132.1 |
| 2004/0216353 A1 * | 11/2004 | Caine | A01M 29/16 43/1 |
| 2011/0226868 A1 * | 9/2011 | Modlin | B05B 17/0684 239/102.1 |
| 2015/0084751 A1 * | 3/2015 | Crawford | B60H 3/0092 340/384.2 |
| 2022/0122578 A1 * | 4/2022 | Cooke | A01M 29/16 |
| 2023/0180738 A1 * | 6/2023 | Cooke | H04R 5/02 119/719 |
| 2023/0363372 A1 * | 11/2023 | Liu | H04R 1/028 |
| 2023/0380408 A1 | 11/2023 | Kim et al. | |
| 2023/0380409 A1 | 11/2023 | Kim et al. | |

FOREIGN PATENT DOCUMENTS

| | | | |
|---|---|---|---|
| CN | 104705285 A * | 6/2015 | |
| CN | 112208291 B | 12/2021 | |
| JP | 2004154101 A * | 6/2004 | |
| JP | 2018-061513 A | 4/2018 | |

(Continued)

*Primary Examiner* — Michael H Wang
(74) *Attorney, Agent, or Firm* — Fox Rothschild LLP

(57) ABSTRACT

A mosquito repellent apparatus for repelling a mosquito in a vehicle using an ultrasonic wave and a method for operating the same is provided. The mosquito repellent apparatus includes a mosquito recognition device that detects a mosquito, an ultrasonic sensor that generates an ultrasonic signal, and a controller. The controller recognizes mosquito appearance in a vehicle using the mosquito recognition device, determines a mosquito appearance stage based on a mosquito sound, and controls power of the ultrasonic sensor based on the mosquito appearance stage.

17 Claims, 17 Drawing Sheets

(56) References Cited

FOREIGN PATENT DOCUMENTS

| | | |
|---|---|---|
| KR | 10-1998-0015912 A | 5/1998 |
| KR | 10-2011-0092635 A | 8/2011 |
| KR | 20-2016-0004298 U | 12/2016 |
| KR | 10-2017-0032123 A | 3/2017 |
| KR | 10-2022-0013805 A | 2/2022 |
| KR | 102504684 B1 | 3/2023 |
| KR | 10-2023-0163780 A | 12/2023 |
| KR | 10-2023-0166341 A | 12/2023 |

* cited by examiner

MOSQUITO REPELLENT APPARATUS AND METHOD FOR OPERATING THE SAME

CROSS-REFERENCE TO RELATED APPLICATION

This application claims under 35 U.S.C. § 119(a) the benefit of Korean Patent Application No. 10-2023-0097010, filed in the Korean Intellectual Property Office on Jul. 25, 2023, the entire contents of which are incorporated herein by reference.

BACKGROUND

Technical Field

The present disclosure relates to a mosquito repellent apparatus for repelling mosquitoes in a vehicle using an ultrasonic wave and a method for operating the same.

Description of the Related Art

Mosquitoes are sanitary pests, which transmit diseases such as malaria, Japanese encephalitis and dengue. Thus, various technologies for repelling mosquitoes have been developed. For example, mosquito repellent devices such as an electronic mosquito repellent incense device and an ultrasonic mosquito repellent system have been developed. Furthermore, research for applying a mosquito repellent system using an ultrasonic wave to a vehicle has been conducted.

SUMMARY

The present disclosure has been made to solve the above-mentioned problems occurring in the existing technologies while advantages achieved by the existing technologies are maintained intact.

An exemplary embodiment of the present disclosure provides a mosquito repellent apparatus for actively controlling power and/or sensitivity of an ultrasonic wave based on a mosquito appearance state and a method for operating the same.

Another exemplary embodiment of the present disclosure provides a mosquito repellent apparatus for operating lighting in a linked manner for each stage based on a mosquito appearance state and a method for operating the same.

Another embodiment of the present disclosure provides a mosquito repellent apparatus for placing ultrasonic transducers for every various radiation angles and rotating a mounting part on which the ultrasonic transducers are arranged and a method for operating the same.

Another embodiment of the present disclosure provides a mosquito repellent apparatus for interworking with a vehicle to determine effectiveness of ultrasonic radiation with regard to a passenger and luggage and providing an optimal mounting position and a method for operating the same.

Another embodiment of the present disclosure provides a mosquito repellent apparatus for controlling ultrasonic power for mosquito repellent and interworking with an air conditioning device to control the air conditioning device and a method for operating the same.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, a mosquito repellent apparatus may include a mosquito recognition device that detects a mosquito, an ultrasonic sensor that generates an ultrasonic signal, and a controller. The controller may be connected with the mosquito recognition device and the ultrasonic sensor. The controller may recognize mosquito appearance in a vehicle using the mosquito recognition device, may determine a mosquito appearance stage based on a mosquito sound, and may control power of the ultrasonic sensor based on the mosquito appearance stage. In some exemplary embodiments, the controller may determine a mosquito appearance stage based on a mosquito sound if the mosquito appearance is recognized.

The controller may variably control a frequency and a radiation pattern of the ultrasonic signal based on the mosquito appearance stage.

The controller may determine an output voltage and sensitivity of the ultrasonic signal based on the mosquito appearance stage.

The controller may change a lighting color based on the mosquito appearance stage.

The controller may recognize mosquito population based on a frequency and a waveform of the mosquito sound, may determine the mosquito appearance stage as stage 1 if the mosquito population is recognized as one, and may determine the mosquito appearance stage as stage 2 if the mosquito population is recognized as two or more.

The controller may obtain a sitting position of a passenger and luggage information from the vehicle, may determine an optimal mounting position of the mosquito repellent apparatus based on the sitting position of the passenger, the luggage information, and a mosquito position, and may output the optimal mounting position on a display.

The controller may determine an optimal mounting position of the mosquito repellent apparatus with regard to multiple reflections from a reflector in the vehicle if there is a mosquito repellent limit area at a current position of the mosquito repellent apparatus due to a power limit of the ultrasonic sensor.

The ultrasonic sensor may include at least one ultrasonic sensor disposed for each radiation angle.

The controller may determine an output voltage and sensitivity of the ultrasonic signal based on a mounting position of the mosquito repellent apparatus and sound pressure output information of the ultrasonic signal for each position in the vehicle.

The vehicle may visualize and output a mounting position of the mosquito repellent apparatus and sound pressure output information of the ultrasonic signal for each position in the vehicle.

The controller may radiate lighting to an ultrasonic radiation position.

According to another embodiment of the present disclosure, a method for operating a mosquito repellent apparatus may include recognizing mosquito appearance in a vehicle using a mosquito recognition device, determining a mosquito appearance stage based on a mosquito sound, and controlling power of an ultrasonic sensor based on the mosquito appearance stage. In some exemplary embodiments, the step of determining a mosquito appearance stage based on a mosquito sound may be made if the mosquito appearance is recognized.

The controlling of the power of the ultrasonic sensor may include variably controlling a frequency and a radiation pattern of an ultrasonic signal radiated by the ultrasonic sensor based on the mosquito appearance stage.

The controlling of the power of the ultrasonic sensor may include determining ultrasonic power and sensitivity of the ultrasonic sensor based on the mosquito appearance stage.

The method may further include controlling a lighting color based on the mosquito appearance stage.

The determining of the mosquito appearance stage may include recognizing mosquito population based on a frequency and a waveform of the mosquito sound, determining the mosquito appearance stage as stage 1 if the mosquito population is recognized as one, and determining the mosquito appearance stage as stage 2 if the mosquito population is recognized as two or more.

The method may further include obtaining, by the vehicle, a sitting position of a passenger and luggage information, determining, by the vehicle, an optimal mounting position of the mosquito repellent apparatus based on the sitting position of the passenger, the luggage information, and mosquito position, and outputting, by the vehicle, the optimal mounting position on a display.

The method may further include visualizing and outputting, by the vehicle, a mounting position of the mosquito repellent apparatus and sound pressure output information of an ultrasonic signal for each position in the vehicle.

The method may further include radiating lighting to an ultrasonic radiation position of the ultrasonic sensor.

The method may further include playing and outputting a mosquito repellent sound source through a speaker based on the mosquito appearance stage.

As discussed, the method and system suitably include use of a controller or processer.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
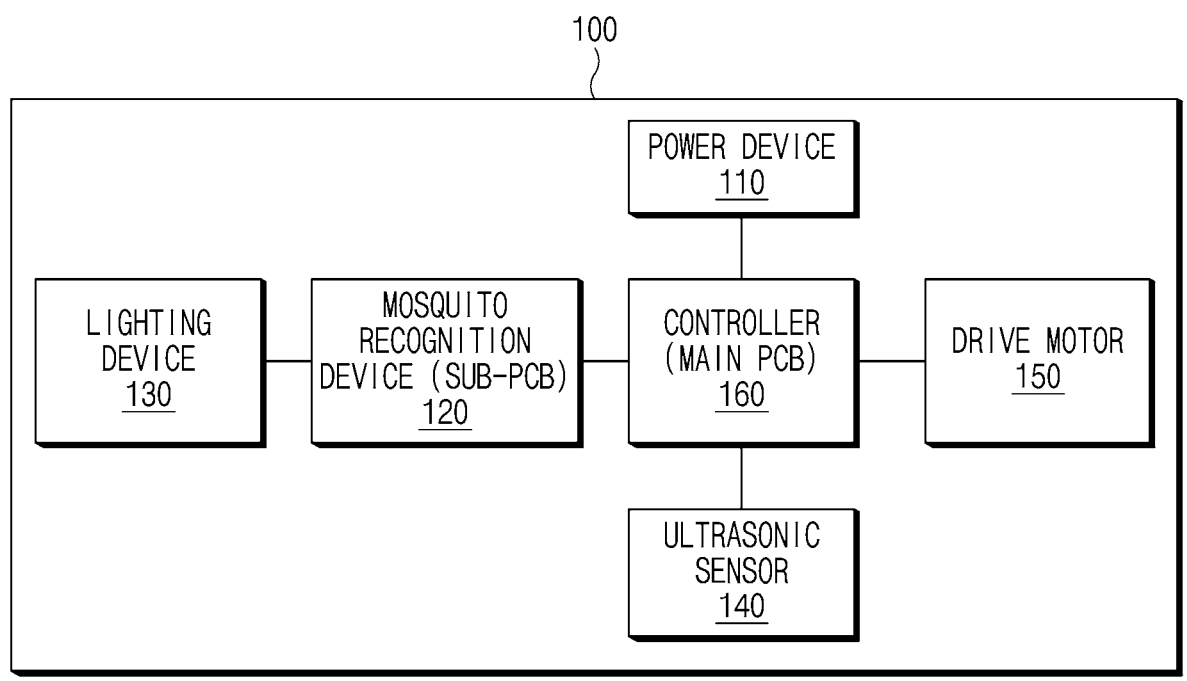
FIG. 1 is a block diagram illustrating a configuration of a mosquito repellent apparatus according to an exemplary embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of this disclosure and the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

FIG. 1 is a block diagram illustrating a configuration of a mosquito repellent apparatus according to an exemplary embodiment of the present disclosure.

Referring to FIG. 1, a mosquito repellent apparatus 100 may include a power device 110, a mosquito recognition device 120, a lighting device 130, an ultrasonic sensor 140, a drive motor 150, and a controller 160. Each of the components 110 to 160 may include at least one processor. The at least one processor may be implemented as an application specific integrated circuit (ASIC), a central processing unit (CPU), a microcontroller, a microprocessor, and/or the like. Each of the components 110 to 160 may further include a non-transitory storage medium which stores instructions executed by the at least one processor. The non-transitory storage medium may include a flash memory, a hard disk, a solid state disk (SSD), a random access memory (RAM), a static RAM (SRAM), a read only memory (ROM), a programmable ROM (PROM), an electrically erasable and programmable ROM (EEPROM), an erasable and programmable ROM (EPROM), and/or the like.

The power device 110 may supply power necessary for operations of the mosquito recognition device 120, the lighting device 130, the ultrasonic sensor 140, the drive motor 150, and the controller 160. At this time, the power device 110 may supply power supplied from the outside or may supply electrical energy stored in a battery (not shown).

The power device 110 may include a function button (or a function switch) 321 for generating a power on and off command. When the power on command is received from the function button 321, for example, a power button, the power device 110 may initiate to supply power to the components 120 to 160 of the mosquito repellent apparatus 100. When the power off command is received from the function button 321, the power device 110 may stop supplying the power to the components 120 to 160 of the mosquito repellent apparatus 100.

The mosquito recognition device 120 may recognize mosquito appearance in a vehicle using a mosquito recognition algorithm stored in a memory (not shown). The mosquito recognition algorithm may be derived through a mosquito correlation analysis by artificial intelligence (AI) learning.

The mosquito recognition device 120 may measure a mosquito sound using a microphone (not shown). The mosquito recognition device 120 may determine whether the frequency of the measured mosquito sound is within a predetermined reference frequency range (e.g., 250 Hz to 1 KHz or average 450 Hz±tolerance). When it is determined that the frequency of the measured mosquito sound is within the predetermined reference frequency range, the mosquito recognition device 120 may recognize (or determine) that the mosquito appears.

The mosquito recognition device 120 may determine a mosquito appearance stage based on the waveform of the measured mosquito sound. When the waveform of the mosquito sound is a single waveform, the mosquito recognition device 120 may determine that the mosquito population is one. When it is determined that the mosquito population is the one, the mosquito recognition device 120 may determine the mosquito appearance stage as stage 1. When the waveform of the mosquito sound is an overlapping waveform, the mosquito recognition device 120 may determine that the mosquito population is two or more. When it is determined that the mosquito population is the two or more, the mosquito recognition device 120 may determine the mosquito appearance stage as stage 2. The mosquito recognition device 120 may determine a state where there is no mosquito appearance as a mosquito non-appearance stage (or stage 0).

When power is supplied from the power device 110, the lighting device 130 may turn on a light source. A light emitting diode (LED), a lamp, and/or the like may be used as the light source. The lighting device 130 may turn on a light source of a predetermined color depending on a control command transmitted from the mosquito recognition device 120. The lighting device 130 may change a light source color (or a lighting color) depending on a control command transmitted from the mosquito recognition device 120. The lighting device 130 may turn off a light source of a first color (e.g., a yellow color) and may turn on a light source of a second color (e.g., a blue color) or a third color (e.g., a red color), depending on an instruction of the mosquito recognition device 120.

As an example, when the mosquito appearance stage is stage 0 (i.e., the mosquito non-appearance stage), the mosquito recognition device 120 may control the lighting device 130 to turn on the light source of the first color. In other words, the lighting device 130 may turn on the light source of the predetermined first color in the mosquito non-appearance state. Thereafter, when it is determined that the mosquito appearance stage is stage 1, the mosquito recognition device 120 may instruct the lighting device 130 to change a lighting color. The lighting device 130 may turn off the light source of the first color and may turn on the light source of the second color, depending on the instruction of the mosquito recognition device 120.

As another example, when the mosquito appearance stage changes from the mosquito non-appearance stage to stage 2, the mosquito recognition device 120 may transmit a lighting color change command to the lighting device 130. The lighting device 130 may turn off the light source of the first color and may turn on the light source of the third color, depending on the received lighting color change command.

As another example, when the mosquito appearance stage changes from stage 1 or 2 to the mosquito non-appearance stage, the mosquito recognition device 120 may transmit a lighting color change command to the lighting device 130. The lighting device 130 may turn off the light source of the second color or the third color and may turn on the light source of the first color, depending on the received lighting color change command.

Furthermore, the lighting device 130 may adjust a lighting radiation angle (or radiation direction) under control of the mosquito recognition device 120. At this time, the mosquito recognition device 120 may identify an ultrasonic radiation position through communication with the controller 160 and may adjust a radiation angle of the light source based on the identified ultrasonic radiation position. The lighting device 130 may radiate lighting to the ultrasonic radiation position or a mosquito appearance position by using a laser or the like as the light source.

The lighting device 130 and the mosquito recognition device 120 may be arranged together on one printed circuit board (PCB).

The ultrasonic sensor 140 may generate an ultrasonic signal or may receive an ultrasonic signal from the outside. The ultrasonic sensor 140 may include an ultrasonic transducer (or an ultrasonic vibrator) and an ultrasonic speaker. The ultrasonic sensor 140 may have a specification such as Table 1 below.

TABLE 1

| Items | Recommended | Sample |
|---|---|---|
| Size (diameter) | 16 mm | 16 mm |
| Center frequency | 30 KHz ± 5 KHz | 30 +/− 1 kHz |
| Bandwidth (−6 dB) | 2 kHz | 2 kHz |
| Transmitting sound pressure level (@ 30 kHz, 10 Vrms, 30 cm) | 110 dB↑ (Max 126 dB) | 117 dB min |
| Capacitance @ 1 kHz +/− 20% | 2400 pF | 2400 pF |
| Max Driving Voltage (cont.) | 28 Vrms (Min 26~Max 32) | 20 Vrms |
| Total Beam Angle (−6 dB) | 45° | 45° |
| Operating Temperature | −30~70° C. | −30~70° C. |
| Storage Temperature | −40~80° C. | −40~80° C. |

The ultrasonic sensor 140 may generate an ultrasonic signal with the frequency and/or the waveform determined by the controller 160. The ultrasonic sensor 140 may adjust an output voltage and/or sensitivity of the ultrasonic signal depending on the control command transmitted from the controller 160.

At least two or more ultrasonic sensors 140 may be mounted on the mosquito repellent apparatus 100. The ultrasonic sensor 140 may be implemented as a piezoceramic, a piezoelectric element, and/or the like.

The drive motor 150 may rotate the ultrasonic sensor 140 based on the radiation pattern determined by the controller 160. For example, the drive motor 150 may rotate the ultrasonic sensor 140 at 180 degrees in a first direction (or a forward direction) and may rotate the ultrasonic sensor 140 at 180 degrees in a second direction (or a reverse direction) opposite to the first direction. At this time, the drive motor 150 may repeat the rotation at 180 degrees in the first direction and the rotation at 180 degrees in the second direction. The drive motor 150 may be implemented as a direct current (DC) motor.

The controller 160 may control the overall operation of the mosquito repellent apparatus 100. The controller 160 may include a DC converter.

The controller 160 may recognize mosquito appearance in the vehicle using the mosquito recognition device 120. When the mosquito appearance is recognized, the controller 160 may determine a mosquito appearance stage using the mosquito recognition device 120. When the mosquito appearance stage is determined, the mosquito recognition device 120 may transmit information about the determined mosquito appearance stage to the controller 160.

When the mosquito appearance in the vehicle is recognized, the controller 160 may control the drive motor 150 to rotate the ultrasonic sensor 140. In other words, the controller 160 may implement a hemispherical sound field through the rotation of the ultrasonic sensor 140. At this time, the ultrasonic sensor 140 may generate an ultrasonic signal with a predetermined frequency (e.g., 30 KHz). The controller 160 may variably control a frequency and/or a radiation pattern of the ultrasonic signal.

The controller 160 may actively control ultrasonic power based on the mosquito appearance stage depending on active ultrasonic control (AUC) logic. The controller 160 may determine an output voltage and/or sensitivity (or a sound pressure output) of the ultrasonic sensor 140 based on the mosquito appearance stage.

The controller 160 may control the ultrasonic sensor 140 to be driven based on the mosquito appearance stage. When the mosquito appearance stage is stage 1, the controller 160 may determine an ultrasonic control scheme as ultrasonic low-power radiation. When the ultrasonic control scheme is determined as the ultrasonic low-power radiation, the controller 160 may adjust the output voltage of the ultrasonic sensor 140 in a range of 5 V to 12 V and may adjust the sensitivity of the ultrasonic sensor 140 to 112 dB or less.

When the mosquito appearance stage is stage 2, the controller 160 may determine the ultrasonic control scheme as ultrasonic high-power radiation. When the ultrasonic control scheme is determined as the ultrasonic high-power radiation, the controller 160 may adjust the output voltage of the ultrasonic sensor 140 in a range of 20 V to 36 V and may adjust the sensitivity of the ultrasonic sensor 140 to 117 dB or more.

The controller 160 may play a mosquito repellent sound source corresponding to the mosquito appearance stage and may output the played sound source to the outside through the ultrasonic speaker of the ultrasonic sensor 140.

Furthermore, the controller 160 may control the lighting device 130 to illuminate the ultrasonic radiation position and/or the mosquito position using the light source such as a laser, when radiating the ultrasonic signal.

The controller 160 may identify whether a mosquito is repelled using the mosquito recognition device 120. When the mosquito sound is not detected by the mosquito recognition device 120 during a predetermined time (e.g., 30 seconds), the controller 160 may determine that the mosquito repellent is completed. When the mosquito sound is detected by the mosquito recognition device 120 during the predetermined time, the controller 160 may determine that the mosquito repellent is not completed.

Figure 2:
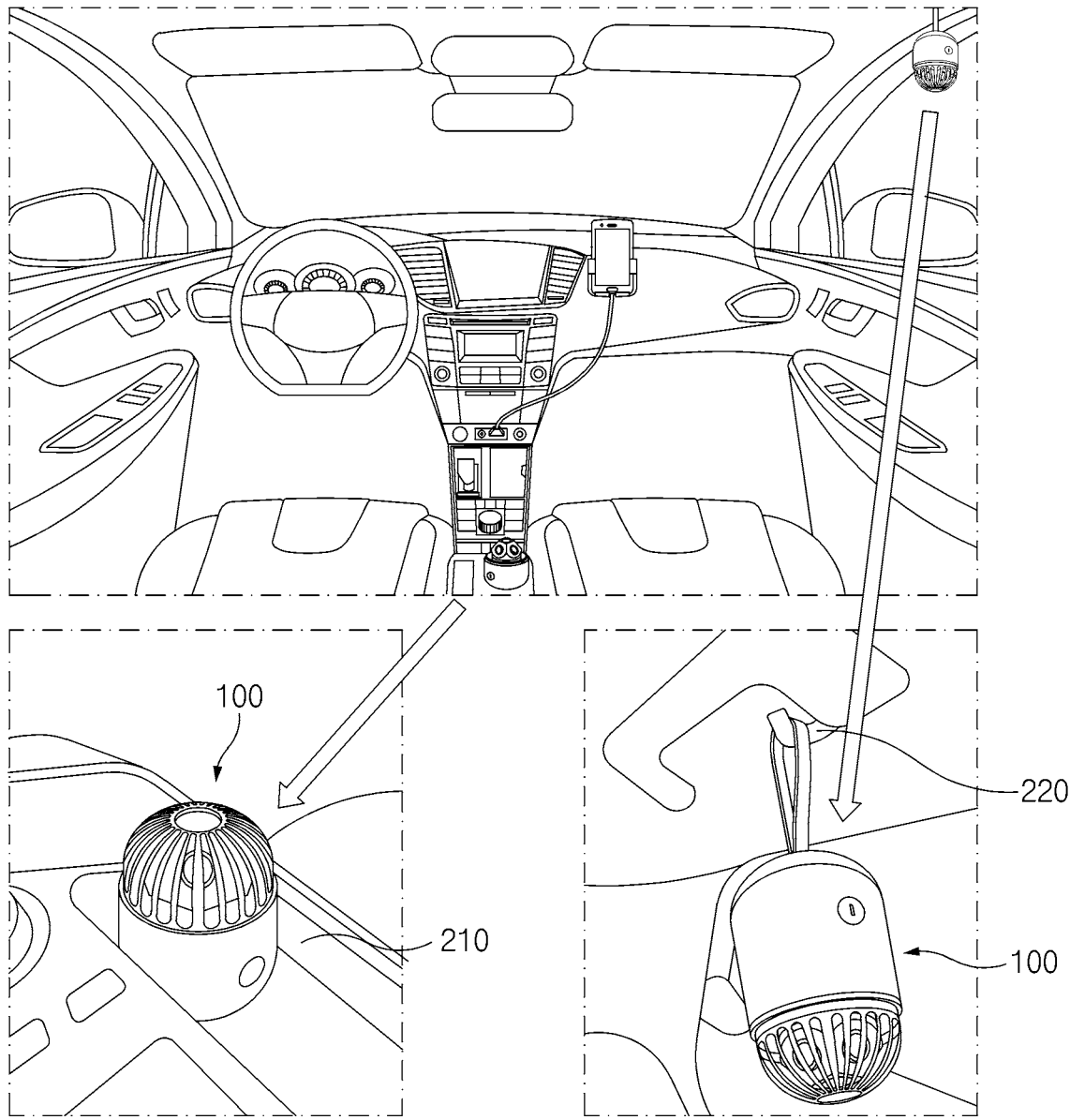
FIG. 2 is a drawing illustrating an example of applying a mosquito repellent apparatus illustrated in FIG. 1 to a vehicle environment.
Figure 3:
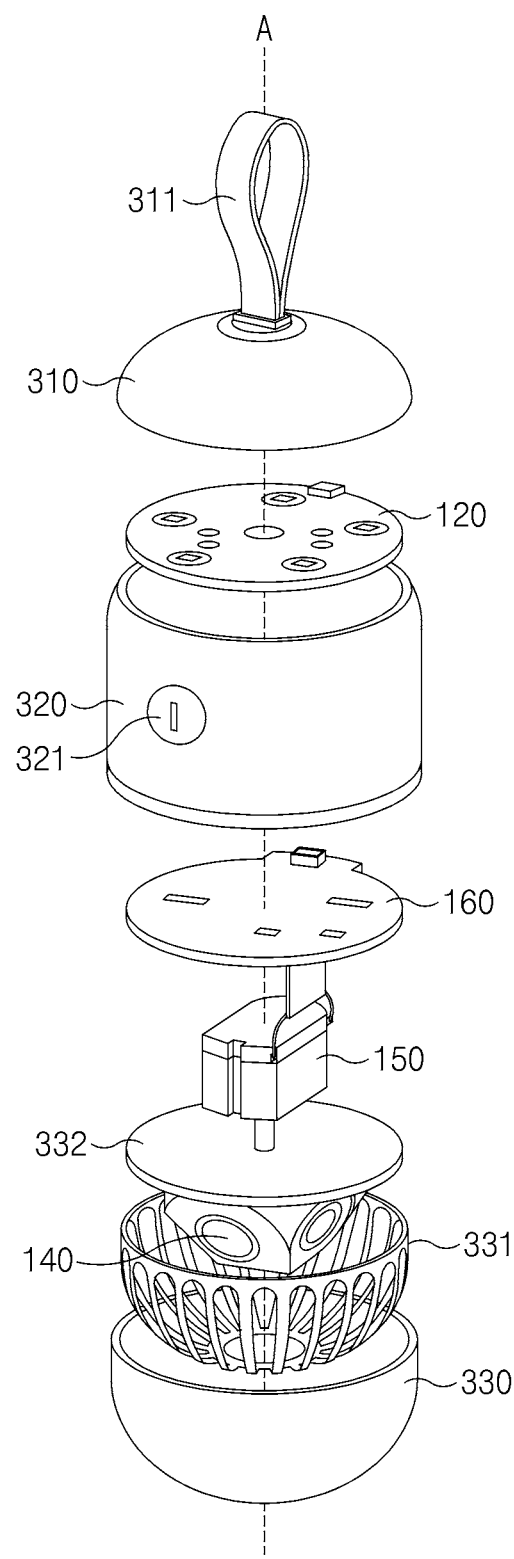
FIG. 3 is an exploded perspective view of a mosquito repellent apparatus illustrated in FIG. 1.
Figure 4:
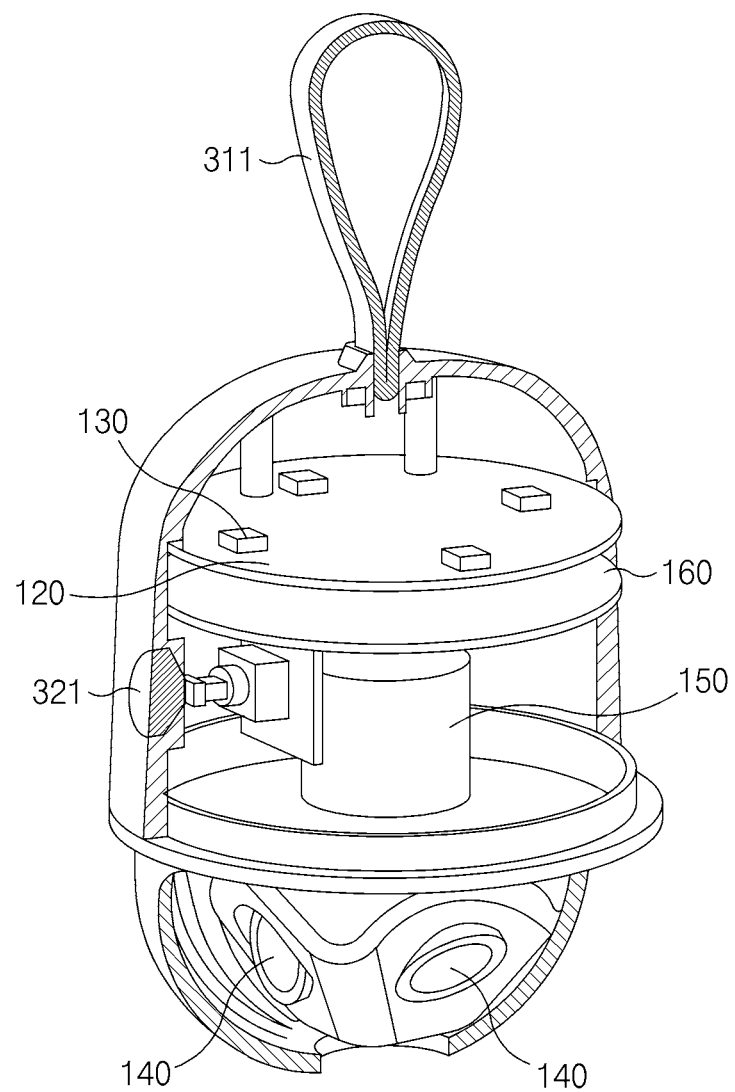
FIG. 4 is a combined perspective view of a mosquito repellent apparatus illustrated in FIG. 1.

FIG. 2 is a drawing illustrating an example of applying a mosquito repellent apparatus illustrated in FIG. 1 to a vehicle environment. FIG. 3 is an exploded perspective view of a mosquito repellent apparatus illustrated in FIG. 1. FIG. 4 is a combined perspective view of a mosquito repellent apparatus illustrated in FIG. 1.

A mosquito repellent apparatus 100 may be manufactured as a portable type. As shown in FIG. 2, the mosquito repellent apparatus 100 may be received a cup holder 210 in a vehicle or may be mounted on a handle hanger 220. The mosquito repellent apparatus 100 may be mounted (or disposed) on another position in the vehicle except for the position shown in FIG. 2.

The mosquito repellent apparatus 100 may be composed of a first body 310, a second body 320, and a third body 330. A strap 311 may be installed on an upper portion of the first body 310.

A mosquito recognition device 120, a lighting device 130, a drive motor 150, and a controller 160 may be arranged in a space formed at an inner side of the second body 320. The mosquito recognition device 120 and the lighting device 130 may be arranged on one PCB.

Furthermore, a function button 321 may be provided at one point of an outer side of the second body 320. The function button 321 may be implemented in the form of a push switch or the like.

An internal cover 331 may be disposed at an inner side of the third body 330.

A sensor mounting part 332 on which at least two of ultrasonic sensors 140 are mounted may be disposed in a space formed at an inner side of the internal cover 331 of the third body 330.

The one ultrasonic sensor 140 may be mounted on a first surface (or an upper surface) of the sensor mounting part 332. An embedded microphone for detecting mosquito appearance together with the ultrasonic sensor 140 may be installed on the first surface.

The at least two ultrasonic sensors 140 may be mounted on a second surface (or an inclined surface) of the sensor mounting part 332. The second surface may be composed of two pairs of two inclined surfaces which are opposite to each other. Slopes (or angles) of inclined surfaces which are opposite to each other may be the same as each other, and slopes of inclined surfaces which are not opposite to each other may be different from each other.

The at least two ultrasonic sensors 140 may be installed on the second surface to have at least two radiation angles. For example, when the ultrasonic sensors 140 are mounted on the four inclined surfaces of the sensor mounting part 332, respectively, a first ultrasonic sensor and a third ultrasonic sensor which are arranged opposite to each other may be installed to have a radiation angle of 45 degrees and a second ultrasonic sensor and a fourth ultrasonic sensor, which are arranged diagonal to the first ultrasonic sensor and the third ultrasonic sensor and are arranged opposite to each other, may be installed to have a radiation angle of 10 degrees.

The drive motor 150 may rotate the sensor mounting part 332 with respect to a longitudinal axis A of the mosquito repellent apparatus 100. In other words, the drive motor 150 may rotate the ultrasonic sensor 140 through the rotation of the sensor mounting part 332.

Figure 5:
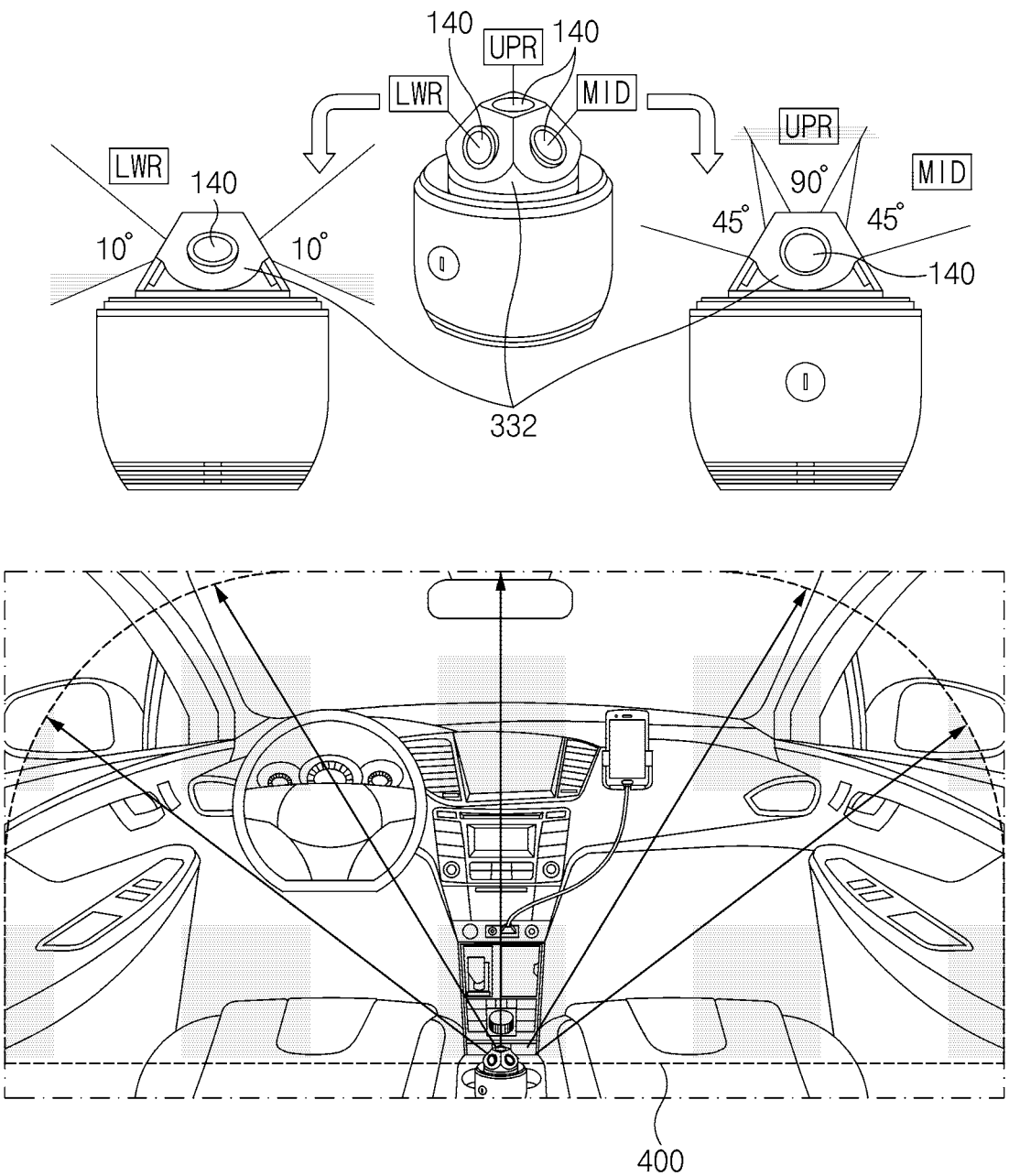
FIG. 5 is a drawing illustrating an example of implementing a hemispherical sound field by a mosquito repellent apparatus illustrated in FIG. 1.

FIG. 5 is a drawing illustrating an example of implementing a hemispherical sound field by a mosquito repellent apparatus illustrated in FIG. 1.

Referring to FIG. 5, radiation angles of ultrasonic sensors mounted on an upper surface and an inclined surface of a sensor mounting part 332 may be assigned in an upper direction UPR, a middle direction MID, and a lower direction LWR, and the ultrasonic sensors may be mounted. For example, the ultrasonic sensor mounted on the upper surface of the sensor mounting part 332 may be installed to face a 90-degree direction, and the ultrasonic sensors mounted on the inclined surfaces may be installed to face a 45-degree direction and a 10-degree direction. As such, as the radiation angles of the ultrasonic sensors may be differently assigned and the ultrasonic sensors may be mounted, a hemispherical sound field 400 of an expanded mosquito repellent effectiveness radius (e.g., 3 m) may be implemented.

Figure 6:
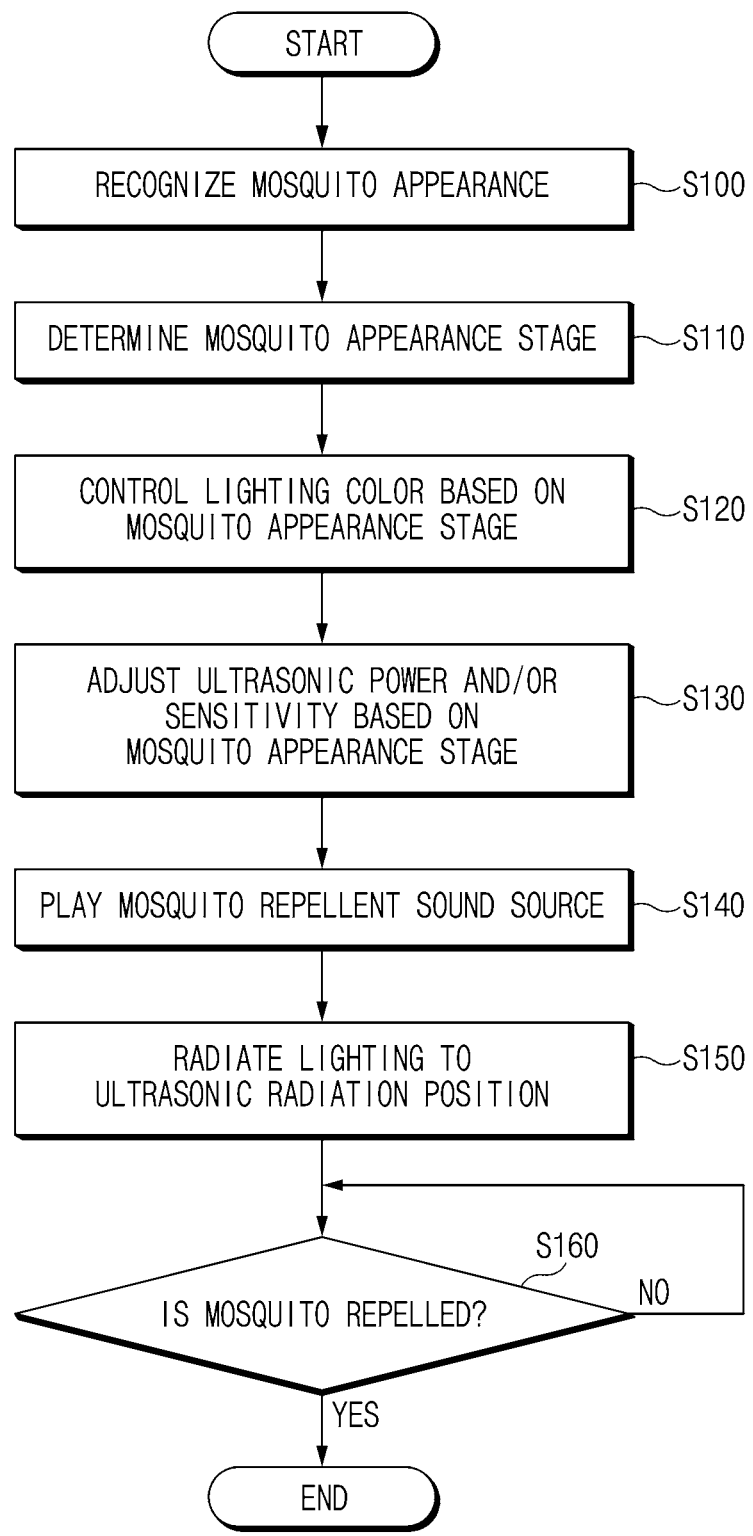
FIG. 6 is a flowchart illustrating a method for operating a mosquito repellent apparatus according to an exemplary embodiment of the present disclosure.

FIG. 6 is a flowchart illustrating a method for operating a mosquito repellent apparatus according to an exemplary embodiment of the present disclosure.

In S100, a mosquito repellent apparatus 100 may recognize mosquito appearance in a vehicle by means of a mosquito recognition device 120. The mosquito recognition device 120 may measure a mosquito sound using a microphone. The mosquito recognition device 120 may determine whether the frequency of the measured mosquito sound is within a predetermined reference frequency range (e.g., 250 Hz to 1 KHz). When it is determined that the frequency of the measured mosquito sound is within the predetermined reference frequency range, the mosquito recognition device 120 may recognize that a mosquito appears.

In S110, the mosquito repellent apparatus 100 may determine a mosquito appearance stage by means of the mosquito recognition device 120. The mosquito recognition device 120 may determine the mosquito appearance stage based on the waveform of the measured mosquito sound. When the waveform of the mosquito sound is a single waveform, the mosquito recognition device 120 may determine the mosquito appearance stage as stage 1. When the waveform of the mosquito sound is an overlapping waveform, the mosquito recognition device 120 may determine the mosquito appearance stage as stable 2.

In S120, the mosquito repellent apparatus 100 may control a lighting color based on the determined mosquito appearance stage. As an example, when the mosquito appearance stage is a mosquito non-appearance stage, the mosquito recognition device 120 may control a lighting device 130 to turn on a light source of a first color. Thereafter, when it is determined that the mosquito appearance stage is stage 1, the mosquito recognition device 120 may instruct the lighting device 130 to change a lighting color. The lighting device 130 may turn off the light source of the first color and may turn on a light source of a second color, depending on the instruction of the mosquito recognition device 120.

As another example, when the mosquito appearance stage changes from the mosquito non-appearance stage to stage 2, the mosquito recognition device 120 may transmit a lighting color change command to the lighting device 130. The lighting device 130 may turn off the light source of the first color and may turn on a light source of a third color, depending on the received lighting color change command.

As another example, when the mosquito appearance stage changes from stage 1 or 2 to the mosquito non-appearance stage, the mosquito recognition device 120 may transmit a lighting color change command to the lighting device 130. The lighting device 130 may turn off the light source of the second color or the third color and may turn on the light source of the first color, depending on the received lighting color change command.

In S130, the mosquito repellent apparatus 100 may adjust ultrasonic power and/or sensitivity based on the determined mosquito appearance stage. When the mosquito appearance stage is determined by the mosquito recognition device 120, the mosquito repellent apparatus 100 may initiate to radiate an ultrasonic signal using an ultrasonic transducer of an ultrasonic sensor 140. The mosquito repellent apparatus 100 may control a drive motor 150 such that a sensor mounting part 332 on which the ultrasonic sensors 140 are mounted repeats 180-degree forward rotation and 180-degree reverse rotation.

Furthermore, a controller 160 of the mosquito repellent apparatus 100 may control the ultrasonic sensor 140 to be driven based on the mosquito appearance stage. When it is identified that the mosquito appearance stage is stage 1, the controller 160 may determine an ultrasonic control scheme as ultrasonic low-power radiation. When the ultrasonic control scheme is determined as the ultrasonic low-power radiation, the controller 160 may adjust the output voltage of the ultrasonic sensor 140 in a range of 5 V to 12 V and may adjust the sensitivity of the ultrasonic sensor 140 to 112 dB or less.

When it is identified that the mosquito appearance stage is stage 2, the controller 160 may determine the ultrasonic control scheme as ultrasonic high-power radiation. When the ultrasonic control scheme is determined as the ultrasonic high-power radiation, the controller 160 may adjust the output voltage of the ultrasonic sensor 140 in a range of 20 V to 36 V and may adjust the sensitivity of the ultrasonic sensor 140 to 117 dB or more.

In S140, the mosquito repellent apparatus 100 may play a mosquito repellent sound source based on the determined mosquito appearance stage. The controller 160 of the mosquito repellent apparatus 100 may access a mosquito repellent sound source corresponding to the mosquito appearance stage from a memory and may play the accessed mosquito repellent sound source. The controller 160 may output the played mosquito repellent sound source to the outside through a speaker.

In S150, the mosquito repellent apparatus 100 may radiate lighting to an ultrasonic radiation position. The lighting device 130 may control a lighting radiation angle (or radiation direction) depending on a control command of the controller 160, which is received through the mosquito recognition device 120. At this time, the mosquito recognition device 120 may identify an ultrasonic radiation position through communication with the controller 160 and may adjust a radiation angle of the light source based on the identified ultrasonic radiation position.

In S160, the mosquito repellent apparatus 100 may determine whether a mosquito in the vehicle is repelled using the mosquito recognition device 120. When a mosquito sound is not detected by the mosquito recognition device 120 during a predetermined time (e.g., 30 seconds), the controller 160 of the mosquito repellent apparatus 100 may determine that the mosquito repellent is completed. When the mosquito sound is detected by the mosquito recognition device 120 during the predetermined time, the controller 160 may determine that the mosquito repellent is not completed.

When it is determined that the mosquito is repelled, the mosquito repellent apparatus 100 may stop a mosquito repellent function. When it is determined that the mosquito is not repelled, the mosquito repellent apparatus 100 may maintain the mosquito repellent function and may perform S160 again whenever the predetermined time elapses.

Figure 7:
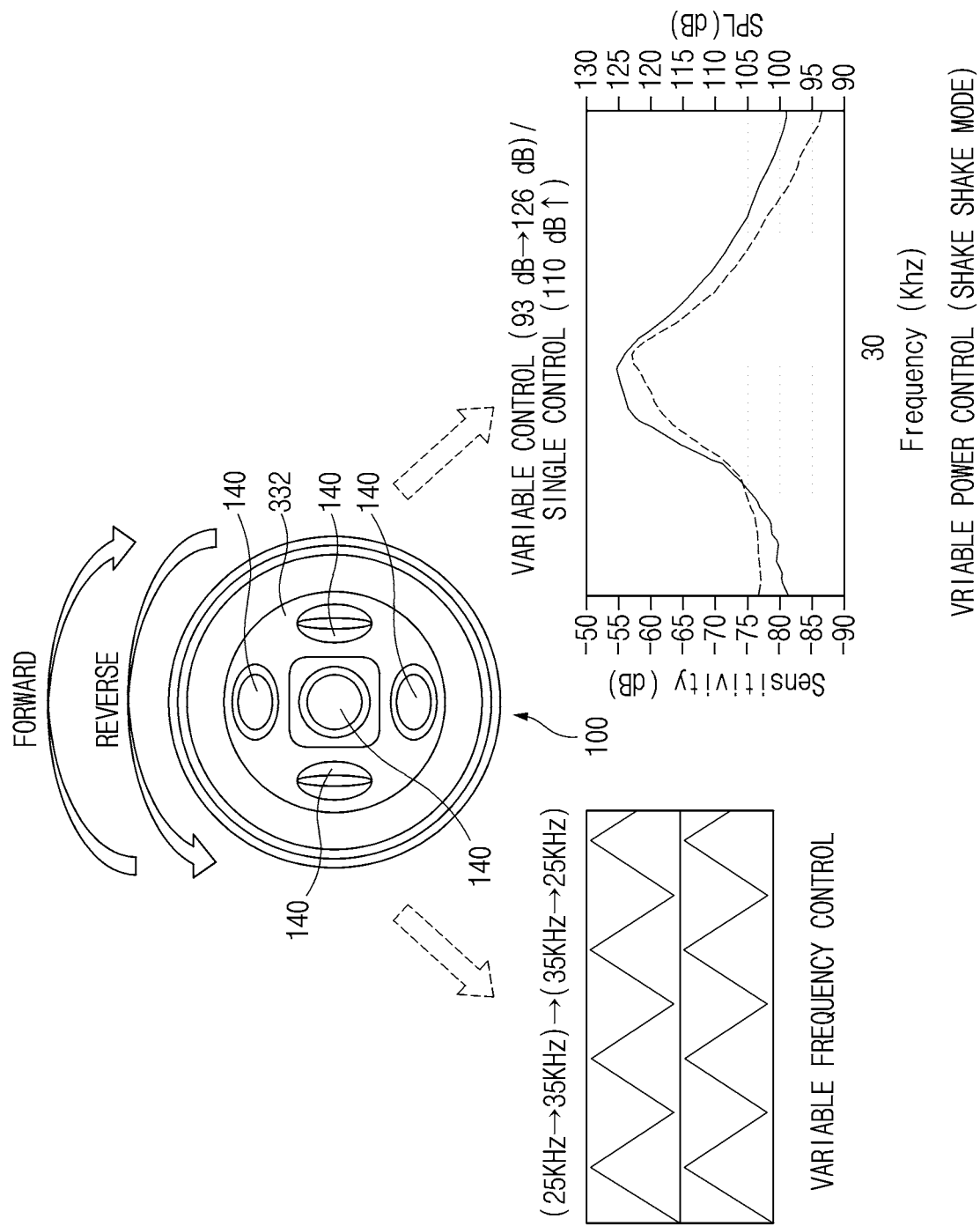
FIG. 7 is a drawing for describing active ultrasonic control logic according to an exemplary embodiment of the present disclosure.

FIG. 7 is a drawing for describing active ultrasonic control logic according to an exemplary embodiment of the present disclosure.

A mosquito repellent apparatus 100 may control a drive motor 150 such that a sensor mounting part 332 on which ultrasonic sensors 140 are mounted repeats 180-degree forward rotation and 180-degree reverse rotation.

The mosquito repellent apparatus 100 may variably control a frequency (or a target frequency) with regard to a mosquito characteristic according to an area. In other words, the mosquito repellent apparatus 100 may variably control the target frequency between 25 KHz and 35 KHz with regard to the mosquito characteristic according to the area, thus maximizing mosquito repellent performance.

The mosquito repellent apparatus 100 may variably control ultrasonic power and/or sensitivity based on a mosquito appearance stage. The mosquito repellent apparatus 100 may detect a mosquito sound used a microphone embedded therein. The mosquito repellent apparatus 100 may classify the mosquito appearance stage as stage 1 or stage 2 using a sound analysis algorithm. When the mosquito appearance stage is stage 1, that is, when about one mosquito is detected, the mosquito repellent apparatus 100 may set the target frequency to 30 KHz, may set an output voltage of an ultrasonic wave to 5 V to 12 V, and may set sensitivity to 112 dB or less. When the mosquito appearance stage is stage 2, that is, when two mosquitoes or more are detected, the mosquito repellent apparatus 100 may set the target frequency to 30 KHz, may set the output voltage of the ultrasonic wave to 20 V to 36 V, and may set sensitivity to 117 dB or more. The mosquito repellent apparatus 100 may actively control an operation of the ultrasonic sensor 140 based on the set target frequency, the output voltage (or the ultrasonic power), and the sensitivity (or the ultrasonic sensitivity).

Figure 8:
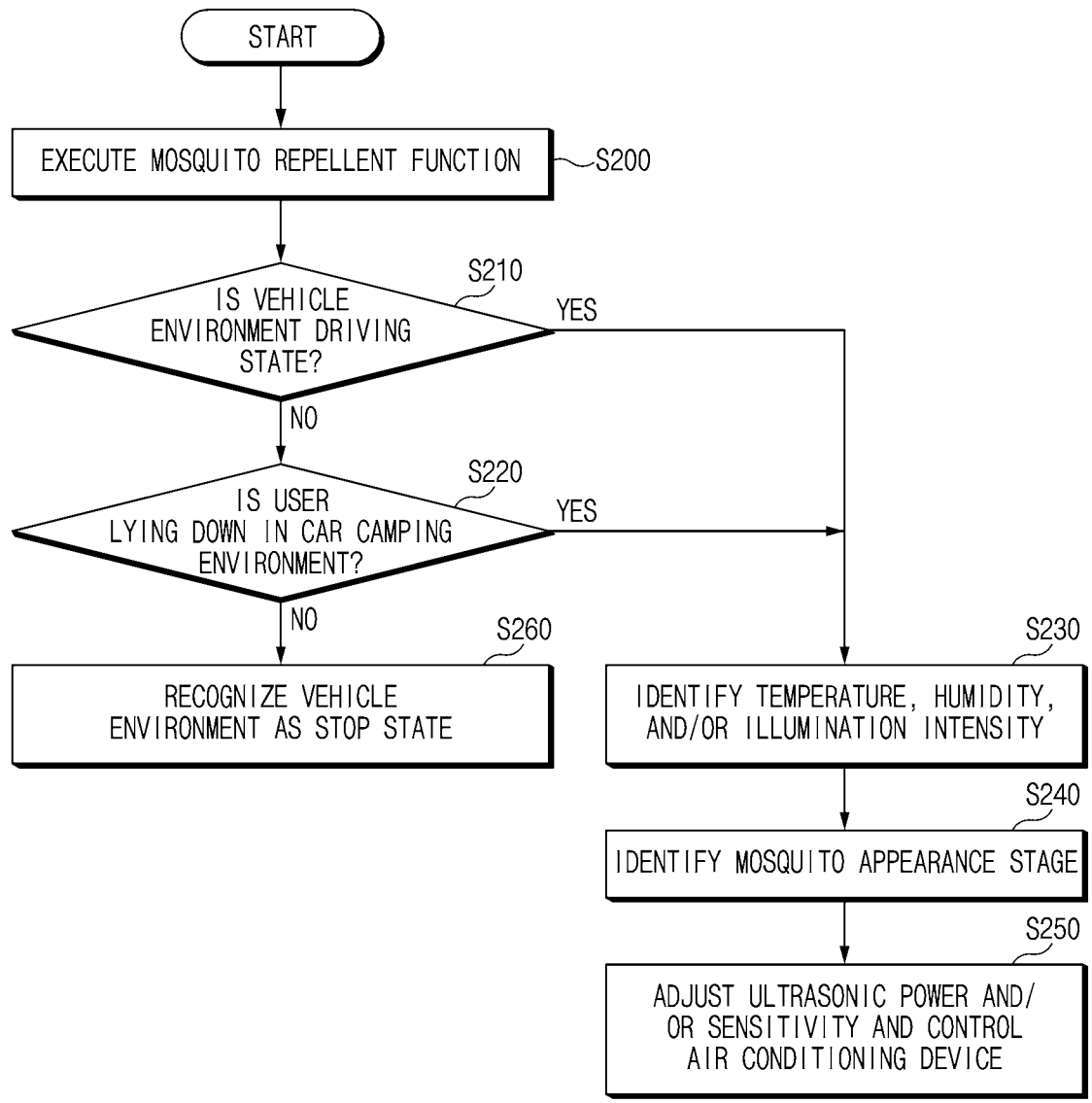
FIG. 8 is a flowchart illustrating a method for operating a mosquito repellent apparatus according to another exemplary embodiment of the present disclosure.

FIG. 8 is a flowchart illustrating a method for operating a mosquito repellent apparatus according to another exemplary embodiment of the present disclosure.

When a function button is pushed by a user, in S200, a mosquito repellent apparatus 100 may execute a mosquito repellent function.

When the mosquito repellent function is executed, in S210, the mosquito repellent apparatus 100 may determine whether a vehicle environment is a driving state. The mosquito repellent apparatus 100 may determine whether a vehicle is traveling based on a vehicle speed, gear information, and/or the like.

In S220, the mosquito repellent apparatus 100 may determine whether a user is lying down in a car camping environment. In other words, the mosquito repellent apparatus 100 may determine whether the user is lying down in a situation where the vehicle environment is car camping. The mosquito repellent apparatus 100 may determine whether the vehicle is in a car camping state and the user in the vehicle is lying down using a camera, a navigation terminal, and/or the like.

When the vehicle environment is the driving state or when the user is lying down in the car camping environment, in S230, the mosquito repellent apparatus 100 may identify a temperature, humidity, illumination intensity, and/or the like in the vehicle using sensors. The mosquito repellent apparatus 100 may identify whether the temperature in the vehicle is a high temperature of 20° C. or more. The mosquito repellent apparatus 100 may identify whether relative humidity in the vehicle is high humidity of 30% or more. The mosquito repellent apparatus 100 may identify whether it is dark in the vehicle as the illumination intensity is less than or equal to reference illumination intensity.

In S240, the mosquito repellent apparatus 100 may identify a mosquito appearance stage by means of a mosquito recognition device 120. The mosquito recognition device 120 may measure a mosquito sound using a microphone. The mosquito recognition device 120 may analyze a waveform of the measured mosquito sound to estimate mosquito population. The mosquito recognition device 120 may determine the mosquito appearance stage based on the estimated mosquito population. In detail, when the mosquito population is estimated as one, the mosquito recognition device 120 may determine the mosquito appearance stage as stage 1. When the mosquito population is estimated as two or more, the mosquito recognition device 120 may determine the mosquito appearance stage as stage 2.

In S250, the mosquito repellent apparatus 100 may adjust ultrasonic power and/or sensitivity based on the mosquito appearance stage and may control an air conditioning device based on the temperature, the humidity, the illumination intensity, and/or the like. The mosquito repellent apparatus 100 may determine ultrasonic power and/or sensitivity based on the mosquito appearance stage. The mosquito repellent apparatus 100 may operate an ultrasonic sensor 140 based on the determined ultrasonic power and/or sensitivity to radiate an ultrasonic wave. The mosquito repellent apparatus 100 may radiate the ultrasonic signal and may operate an air conditioning function of the air conditioning device to decrease the temperature to 20° C. or less when the temperature is greater than or equal to 25° C. Furthermore, when the relative humidity is greater than or equal to 30%, the mosquito repellent apparatus 100 may operate the air conditioning device to decrease the relative humidity to 30% or less. The mosquito repellent apparatus 100 may transmit and receive data (e.g., a control command) with the air conditioning device using wired or wireless communication.

When the vehicle environment is not the driving state and when the user is not lying down in the car camping environment, in S260, the mosquito repellent apparatus 100 may recognize the vehicle environment as a stop state.

Figure 9:
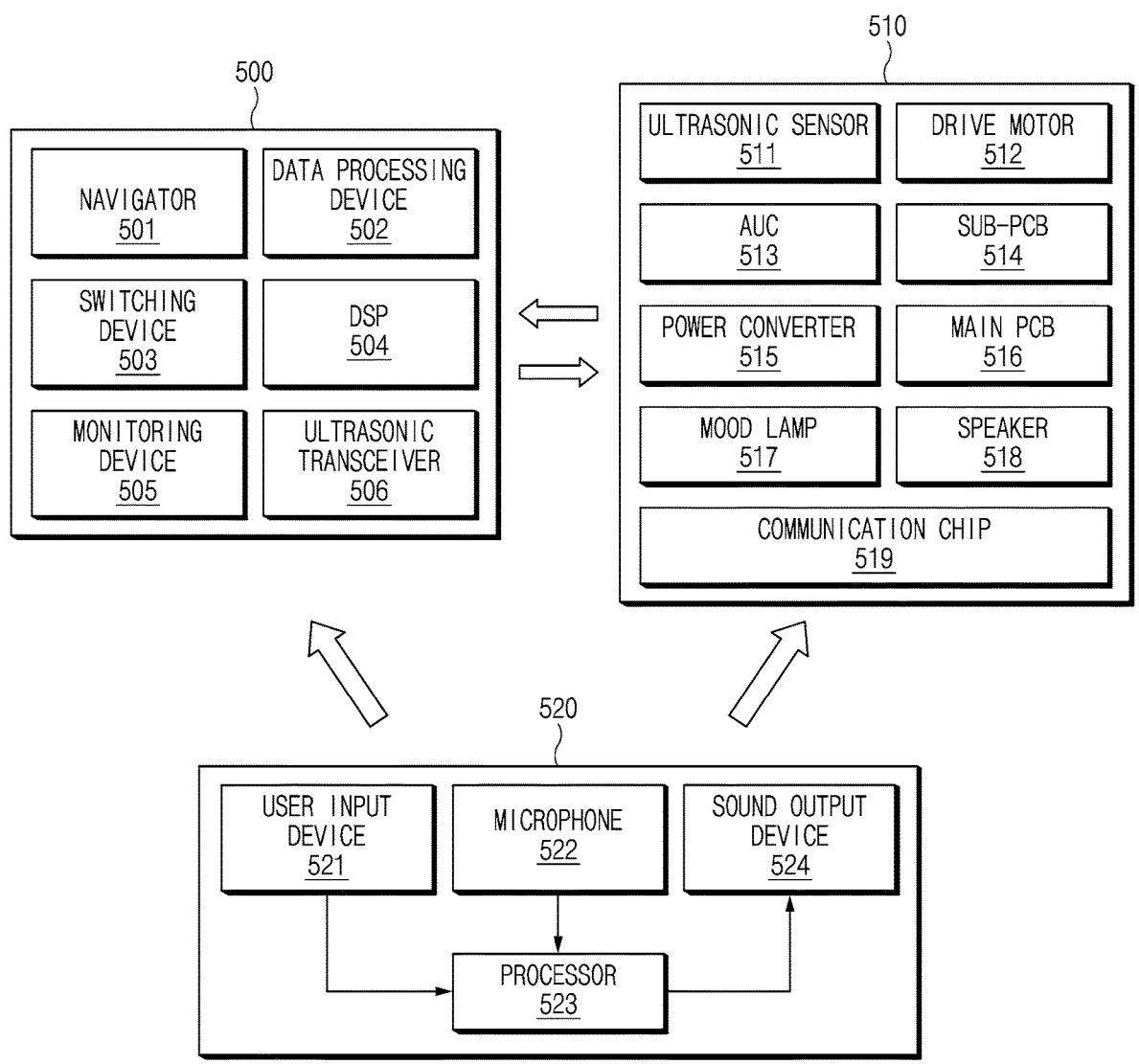
FIG. 9 is a block diagram illustrating a configuration of a mosquito repellent system according to another exemplary embodiment of the present disclosure.

FIG. 9 is a block diagram illustrating a configuration of a mosquito repellent system according to another exemplary embodiment of the present disclosure.

Referring to FIG. 9, the mosquito repellent system may include a vehicle 500, a mosquito repellent apparatus 510, and a user terminal 520.

The vehicle 500 may include a navigator 501, a data processing device 502, a switching device 503, a digital signal processor (DSP) 504, a monitoring device 505, and an ultrasonic transceiver 506.

When a destination is set, the navigator 501 may navigate a driving route to the destination and may guide a vehicle 500 along the navigated driving route. The navigator 501 may search for an optimal route (e.g., the shortest distance, a minimum time, and/or the like) by reflecting real-time traffic information when searching for a driving route. Although not illustrated in the drawing, the navigator 501 may include a memory for storing map data, a global positioning system (GPS) receiver for measuring a vehicle location, a communication module for receiving traffic information from the outside, a user interface (e.g., a touch screen, a display, a speaker, and the like) for assisting the vehicle 500 and a user (e.g., a driver, a passenger, or the like) to interact with each other, a processor for navigating a driving route and guiding the vehicle 500 along the navigated driving route, and/or the like.

The data processing device 502 may analyze data input from the outside to generate information. The data processing device 502 may analyze data processed by the DSP 504 to generate sound pressure (or sound pressure level) information of an ultrasonic signal.

The DSP 504 may convert an analog signal into a digital signal and may perform digital signal processing. The DSP 504 may generate an ultrasonic signal by means of the ultrasonic transceiver 506 and may receive and process an ultrasonic signal reflected from an object (e.g., a passenger, a mosquito, or the like).

The monitoring device 505 may monitor sitting information (e.g., a sitting position, a sitting posture, and the like) of the passenger in the vehicle 500, luggage information (e.g., a loading capacity, a size, and the like), and/or the like.

The ultrasonic transceiver 506 may transmit or receive an ultrasonic signal. The ultrasonic transceiver 506 may include an amplifier for amplifying an ultrasonic signal.

The mosquito repellent apparatus 510 may include an ultrasonic sensor 511, a drive motor 512, active ultrasonic control (AUC) 513, a sub-PCB 514, a power converter 515, a main PCB 516, a mood lamp 517, a speaker 518, and a communication chip 519.

The ultrasonic sensor 511 may generate an ultrasonic signal based on a target frequency, ultrasonic power, and/or sensitivity determined by the main PCB 516.

The drive motor 512 may rotate a sensor mounting part (e.g., a sensor mounting part 332 of FIG. 3) on which the ultrasonic sensor 511 is disposed.

The AUC 513 may control an output voltage and/or sensitivity of the ultrasonic signal based on a mosquito appearance stage.

The sub-PCB 514 may detect a mosquito sound using a microphone (not shown). The sub-PCB 514 may estimate mosquito population based on a frequency and/or a waveform of a mosquito sound. The sub-PCB 514 may determine a mosquito appearance stage based on the estimated mosquito population.

The power converter 515 may convert commercial power (e.g., 220 V) into a predetermined voltage (e.g., 12 V). The power converter 515 may convert power stored in a battery (not shown) into the predetermined voltage. The power converter 515 may supply the converted power to the respective components constituting the mosquito repellent apparatus 510.

The main PCB 516 may determine an output voltage, sensitivity, and/or the like of the ultrasonic signal depending on the mosquito appearance stage determined by the sub-PCB 514. The main PCB 516 may play and output a mosquito repellent sound source through the speaker 518 based on repellent species information transmitted from the user terminal 520. The main PCB 516 may play and output a mosquito repellent sound source through the speaker 518 based on the mosquito appearance stage. The main PCB 516 may modulate an ultrasonic frequency based on repellent species information received through the communication chip 519.

The mood lamp 517 may be turned on or off according to a control command received from the sub-PCB 514. The mood lamp 517 may include light sources of different colors.

The mood lamp 517 may turn off a light source of an existing color and may turn on a light source of a color different from the existing color to change a lighting color, depending on an instruction of the sub-PCB 514.

The speaker 518 may output a mosquito repellent sound source played while the ultrasonic sensor 511 transmits the ultrasonic signal.

The communication chip 519 may support the mosquito repellent apparatus 510 to communicate with the vehicle 500 and/or the user terminal 520 through wireless communication. The communication chip 519 may receive repellent species information selected by a user, which is transmitted from the user terminal 520. The communication chip 519 may receive the mosquito repellent sound source transmitted from the user terminal 520. The communication chip 519 may include a Bluetooth chip, a wireless-fidelity (Wi-Fi) chip, and/or the like.

The mosquito repellent function may be installed in advance in the form of an application in the user terminal 520. The user terminal 520 may turn on or off the mosquito repellent function depending on the control command of the vehicle 500.

The user terminal 520 may include a user input device 521, a microphone 522, a processor 523, and a sound output device 524.

The user input device 521 may generate data according to manipulation of the user. The user input device 521 may include a touch screen, a button, and/or the like.

When receiving a mosquito repellent function on command from the user input device 521 or when receiving the mosquito repellent function on command from the vehicle 500, the processor 523 may execute the mosquito repellent function. When receiving a mosquito repellent function off command from the user input device 521, the processor 523 may end the mosquito repellent function.

When the mosquito repellent function is executed, the processor 523 may measure an ambient sound (e.g., a mosquito sound or the like) using the microphone 522.

The processor 523 may select a repellent species depending on data received from the user input device 521. The repellent species may include a mosquito, a cockroach, a mouse, and/or the like.

The processor 523 may play and output a mosquito repellent sound source through the sound output device 524. The processor 523 may output the played mosquito repellent sound source to the outside through the speaker 518 of the mosquito repellent apparatus 510 using wireless communication. The processor 523 may transmit the mosquito repellent sound source to the mosquito repellent apparatus 510.

The sound output device 524 may include a function of recognizing whether the mosquito repellent apparatus 510 operates.

Figure 10:
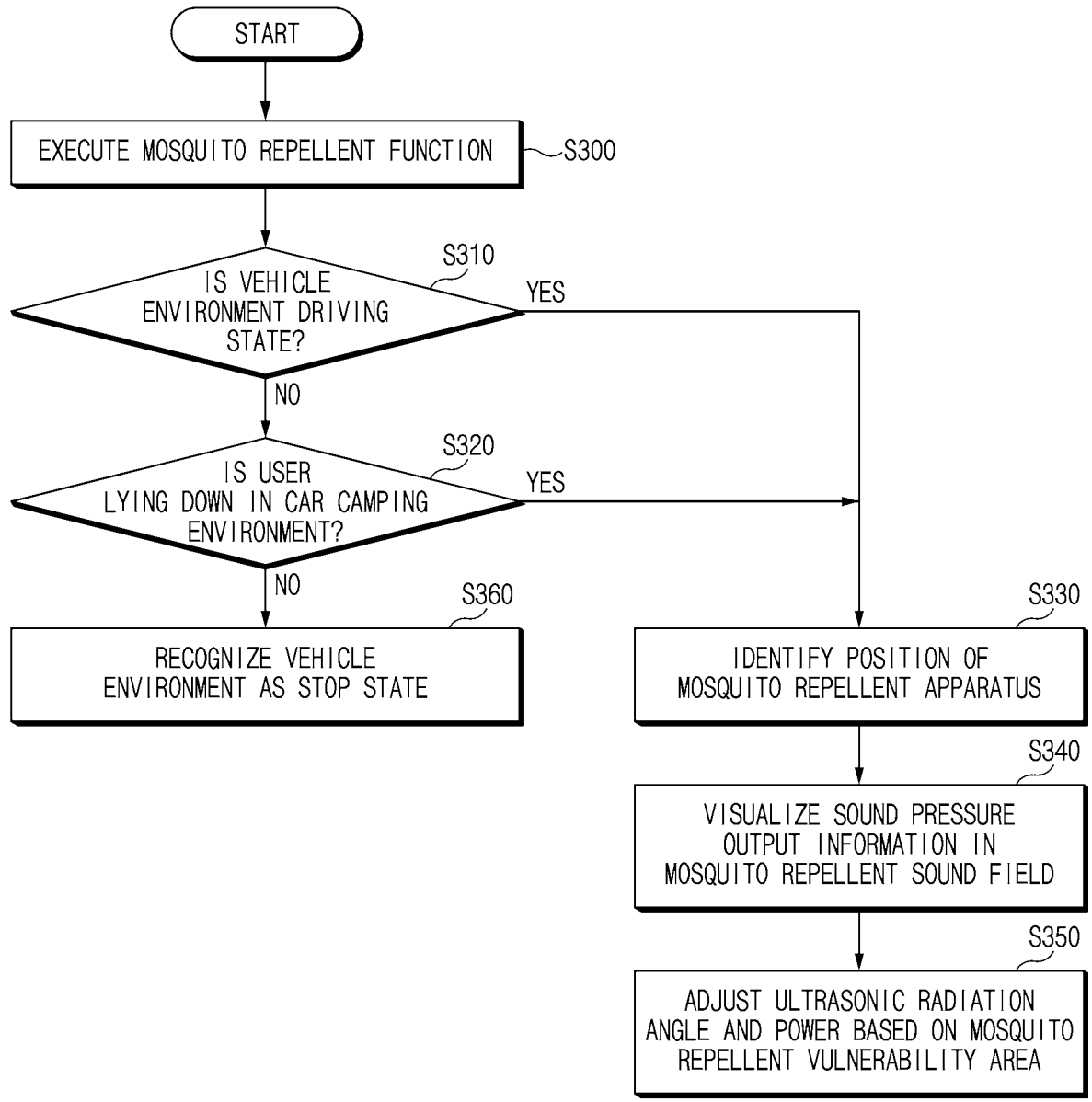
FIG. 10 is a flowchart illustrating a method for operating a mosquito repellent system according to another exemplary embodiment of the present disclosure.
Figure 11:
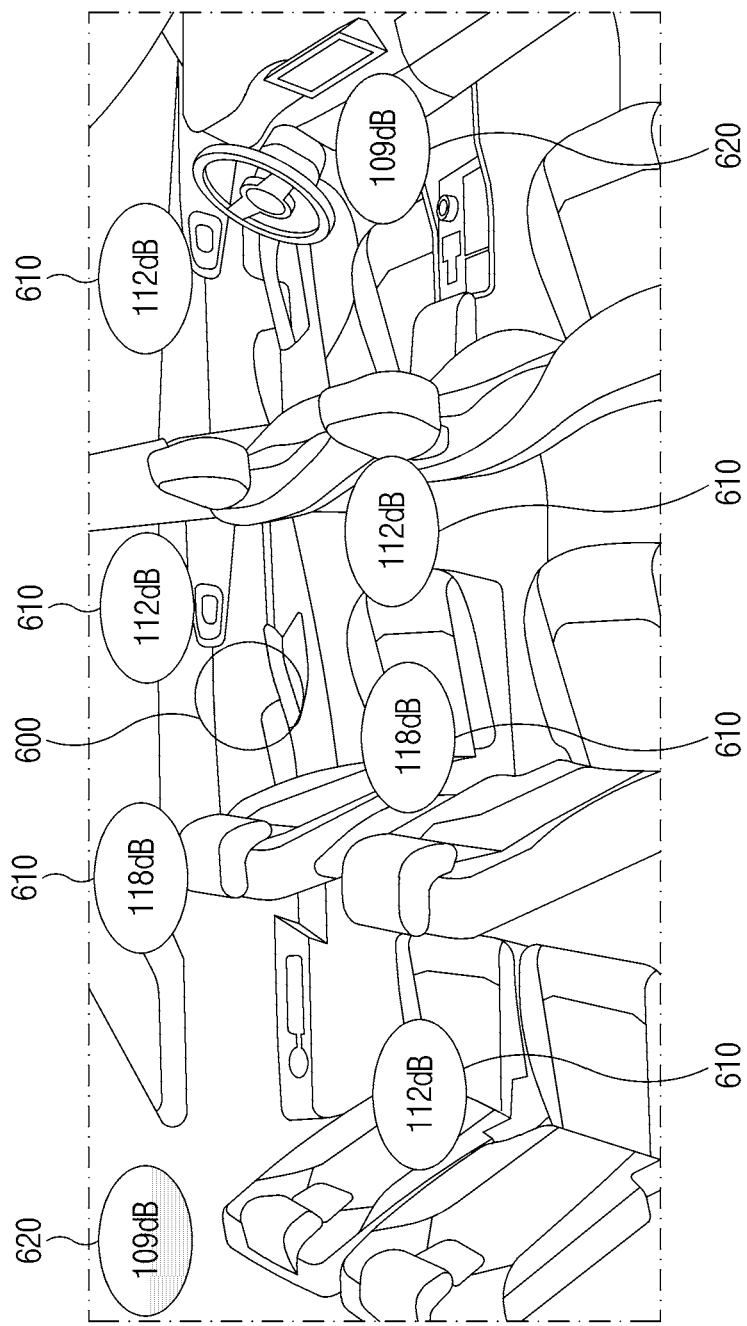
FIG. 11 is a drawing illustrating an example of visualizing ultrasonic sound pressure output information according to another exemplary embodiment of the present disclosure.

FIG. 10 is a flowchart illustrating a method for operating a mosquito repellent system according to another exemplary embodiment of the present disclosure. FIG. 11 is a drawing illustrating an example of visualizing ultrasonic sound pressure output information according to another exemplary embodiment of the present disclosure.

In S300, a user terminal 520 may execute a mosquito repellent function depending on a user input. When the mosquito repellent function is executed, the user terminal 520 may transmit data (or information) indicating that the mosquito repellent function is executed to a vehicle 500 and a mosquito repellent apparatus 510.

When the mosquito repellent function is executed, in S310, the vehicle 500 may determine whether a vehicle environment is a driving state. The vehicle 500 may determine whether the vehicle 500 is traveling based on a vehicle speed, gear information, and/or the like.

In S320, the vehicle 500 may determine whether a user is lying down in a car camping environment. In other words, the vehicle 500 may determine whether the user is in a lying state in a situation where the vehicle environment is car camping. The vehicle 500 may determine whether the vehicle 500 is in a car camping state and the user in the vehicle 500 is lying down using a camera, a navigator, and/or the like.

When the vehicle environment is the driving state or when the user is lying down in the car camping environment, in S330, the vehicle 500 may identify a position of the mosquito repellent apparatus 510. The vehicle 500 may identify a position at which the mosquito repellent apparatus 510 is mounted using the camera or the like.

In S340, the vehicle 500 may visualize sound pressure output information in a mosquito repellent sound field. The mosquito repellent apparatus 510 may radiate an ultrasonic signal. The vehicle 500 may monitor sound pressure in the mosquito repellent sound field using sound pressure sensors installed at different interior positions (e.g., a roof trim, a seat side end, and/or a center console). The vehicle 500 may separately display an area (or a mosquito repellent satisfaction area) which belongs to a mosquito repellent sound field effectiveness radius and a mosquito repellent vulnerability area which deviates from the mosquito repellent sound field effectiveness radius on a display. Referring to FIG. 11, the vehicle 500 may display a position 600 at which the mosquito repellent apparatus 510 is mounted. The vehicle 500 may display sound pressure for each position in the vehicle 500 and may display whether mosquito repellent is vulnerable. In detail, the vehicle 500 may determine a mosquito repellent satisfaction area 610, when the sound pressure is greater than or equal to 110 dB, and may determine a mosquito repellent vulnerability area 620 and may process a sign of the area 620 to be different from the mosquito repellent satisfaction area 610, when the sound pressure is less than 110 dB.

In S350, the mosquito repellent apparatus 510 may adjust an ultrasonic radiation angle and power based on the mosquito repellent vulnerability area. The mosquito repellent apparatus 510 may receive information about the mosquito repellent vulnerability area from the vehicle 500 and may adjust a radiation angle, an output voltage, and/or sensitivity of the ultrasonic signal based on the received information about the mosquito repellent vulnerability area.

When the vehicle environment is not the driving state and when the user is not lying down in the car camping environment, in S360, the vehicle 500 may recognize the vehicle environment as a stop state.

Figure 12:
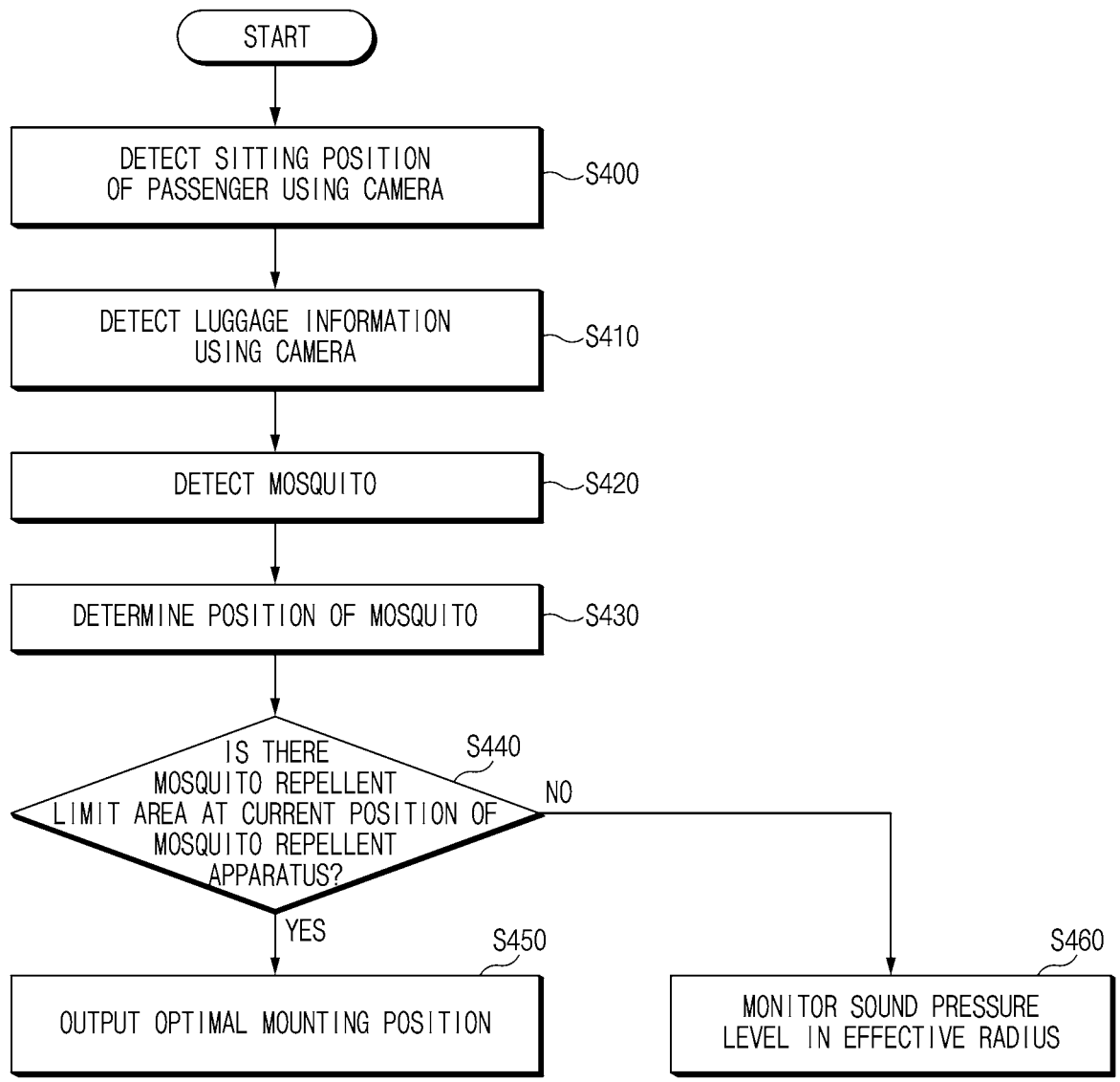
FIG. 12 is a flowchart illustrating a method for operating a mosquito repellent system according to another exemplary embodiment of the present disclosure.

FIG. 12 is a flowchart illustrating a method for operating a mosquito repellent system according to another exemplary embodiment of the present disclosure.

When a mosquito repellent function is executed, in S400, the vehicle 500 may detect a sitting position of a passenger in the vehicle 500 using a camera. The vehicle 500 may detect a sitting position of the passenger and may also detect a sitting posture of the passenger, using the camera.

In S410, the vehicle 500 may detect information about luggage in the vehicle 500 using the camera. The vehicle 500 may obtain information such as a position, a loading state, a loading capacity, and/or a size of luggage in the vehicle 500 by means of the camera.

In S420, a mosquito repellent apparatus 510 may detect a mosquito. The mosquito repellent apparatus 510 may transmit an ultrasonic wave by means of an ultrasonic sensor 511 and may determine whether a target is a mosquito based on a signal reflected from the target.

In S430, the mosquito repellent apparatus 510 may determine a position of the mosquito using the ultrasonic sensor 511. The ultrasonic sensor 511 may determine the position of the mosquito on a plane, based on a separation distance and a direction of the mosquito.

In S440, the vehicle 500 may determine whether there is a mosquito repellent limit area at a position where the mosquito repellent apparatus 510 is currently mounted. As an example, when the mosquito repellent apparatus 510 is mounted on a cup holder in the vehicle 500, the vehicle 500 may determine whether there is an area where mosquito repellent care is limited. As another example, when the mosquito repellent apparatus 510 is mounted on a handle hanger, the vehicle 500 may determine whether there is an area where mosquito repellent care is limited. As another example, the vehicle 500 may determine whether there is a mosquito repellent limit area due to a power limit of the ultrasonic sensor 511. In other words, when the ultrasonic sensor 511 of the mosquito repellent apparatus 510 transmits an ultrasonic signal at maximum power, the vehicle 500 may extract a mosquito repellent vulnerability area where sound pressure of the ultrasonic signal received by a sound pressure sensor installed for each position in the vehicle 500 is less than reference sound pressure.

When it is determined that there is the mosquito repellent limit area in the vehicle 500, in S450, the vehicle 500 may output an optimal mounting position. The vehicle 500 may determine an optimal mounting position of the mosquito repellent apparatus 510 based on the mosquito position, the sitting position of the passenger, and/or the luggage information.

Furthermore, the vehicle 500 may additionally consider a reflection angle on a reflector (e.g., a door glass) according to the mounting position of the mosquito repellent apparatus 510 and/or the radiation angle of the ultrasonic signal to determine an optimal mounting position of the mosquito repellent apparatus 510. In other words, the vehicle 500 may consider a cover range by the reflector in the vehicle 500 according to the mounting position of the mosquito repellent apparatus 510 to determine the optimal mounting position of the mosquito repellent apparatus 510. The reflector in the vehicle 500 may include a front windshield glass, a side door glass, a rear glass, and/or the like.

The vehicle 500 may determine the optimal mounting position with reference to a lookup table in which a cover range by the reflector in the vehicle 500 according to the mounting position of the mosquito repellent apparatus 510 and a cover range according to the mounting position of the mosquito repellent apparatus 510 are defined. For example, when it is determined that the mosquito repellent limit area is able to be covered by multiple reflections from the door glasses at the driver's seat and the passenger seat at the position where the mosquito repellent apparatus 510 is currently mounted, the vehicle 500 may determine a center console cup holder, which is capable of covering a front portion of the vehicle 500 and covering the mosquito repellent limit area using the multiple reflections from the door glasses at the driver's seat and the passenger seat, as the optimal mounting position.

When it is determined that there is no mosquito repellent limit area, in S460, the vehicle 500 may monitor a sound pressure level within a sound pressure effectiveness radius of the mosquito repellent apparatus 510. The sound field effectiveness radius may refer to a predetermined radius with respect to the mounting position of the mosquito repellent apparatus 510. The vehicle 500 may visualize and output the monitored sound pressure level on a display of a navigator 501. When monitoring the sound pressure level in the sound field effectiveness radius, the vehicle 500 may monitor the sound pressure level with regard to multiple reflections from the reflector in the vehicle 500.

Figure 13:
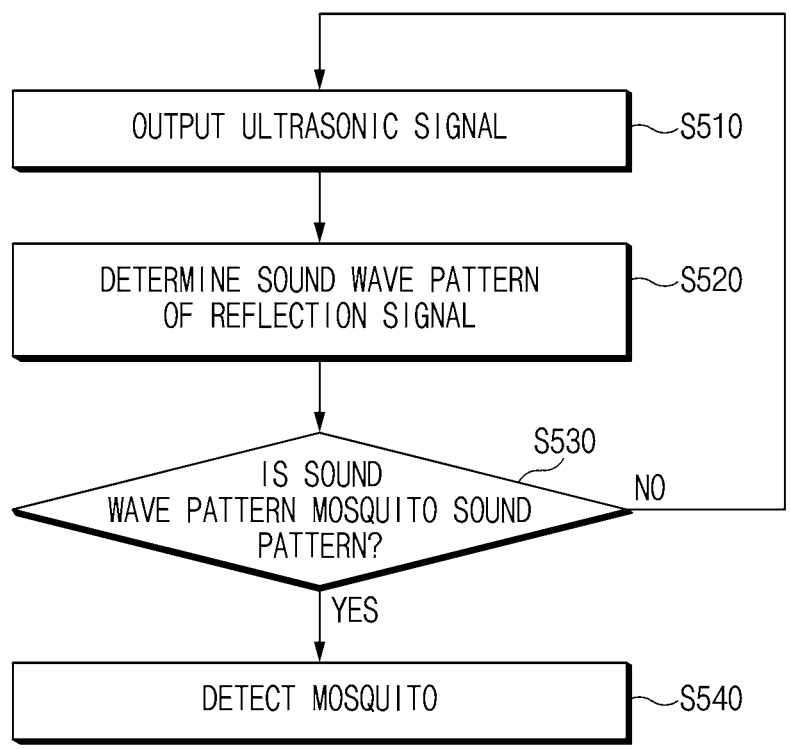
FIG. 13 is a flowchart illustrating a method for recognizing mosquito appearance according to another exemplary embodiment of the present disclosure.

FIG. 13 is a flowchart illustrating a method for recognizing mosquito appearance according to another exemplary embodiment of the present disclosure.

In S510, a mosquito repellent apparatus 510 may output an ultrasonic signal by means of an ultrasonic sensor 511.

In S520, the mosquito repellent apparatus 510 may determine a sound wave pattern of a reflection signal reflected from a target.

In S530, the mosquito repellent apparatus 510 may determine whether the sound wave pattern corresponds to a mosquito sound pattern.

When it is determined that the sound wave pattern corresponds to the mosquito sound pattern, in S540, the mosquito repellent apparatus 510 may determine that the target corresponds to a mosquito. The mosquito repellent apparatus 510 determine a position of the mosquito. When the target is the mosquito, the mosquito repellent apparatus 510 may determine the position of the target.

Figure 14:
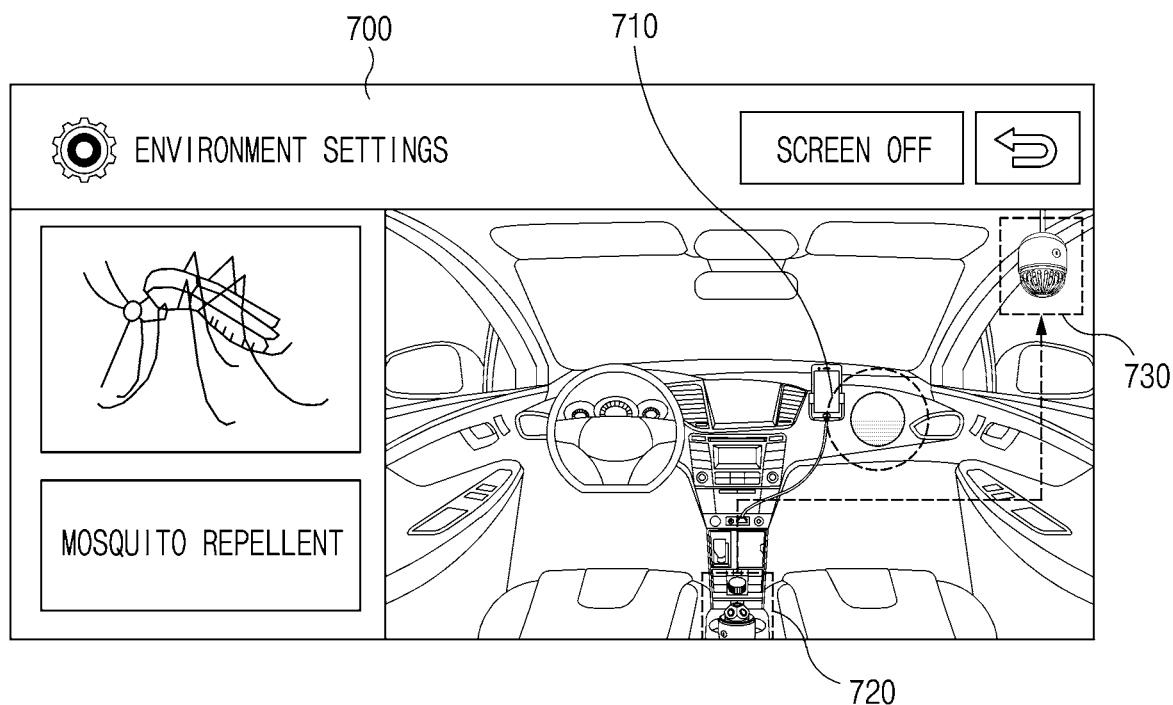
FIG. 14 illustrates an example of outputting a mosquito position and an optimal mounting position according to another exemplary embodiment of the present disclosure.

FIG. 14 illustrates an example of outputting a mosquito position and an optimal mounting position according to another exemplary embodiment of the present disclosure.

Referring to FIG. 14, a vehicle 500 may display a mosquito position 710 on a display 700. The vehicle 500 may obtain mosquito position information through communication with a mosquito repellent apparatus 510.

Furthermore, the vehicle 500 may display a current mounting position 720 and an optimal mounting position 730 of the mosquito repellent apparatus 510. When it is determined that mosquito repellent is limited at the current mounting position 720 of the mosquito repellent apparatus 510, the vehicle 500 may determine and display the optimal mounting position 730. The vehicle 500 may display the optimal mounting position 730 of the mosquito repellent apparatus 510 and may output a voice message "Hang the mosquito repellent apparatus on the handle".

Figure 15:
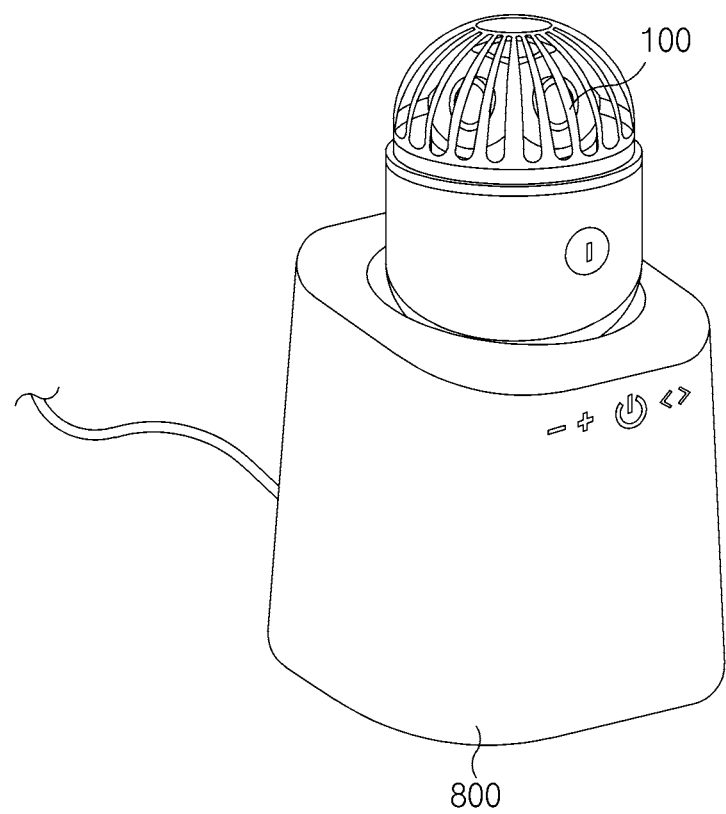
FIG. 15 is a perspective view illustrating a Bluetooth speaker interworking mosquito repellent system according to another exemplary embodiment of the present disclosure.
Figure 16:
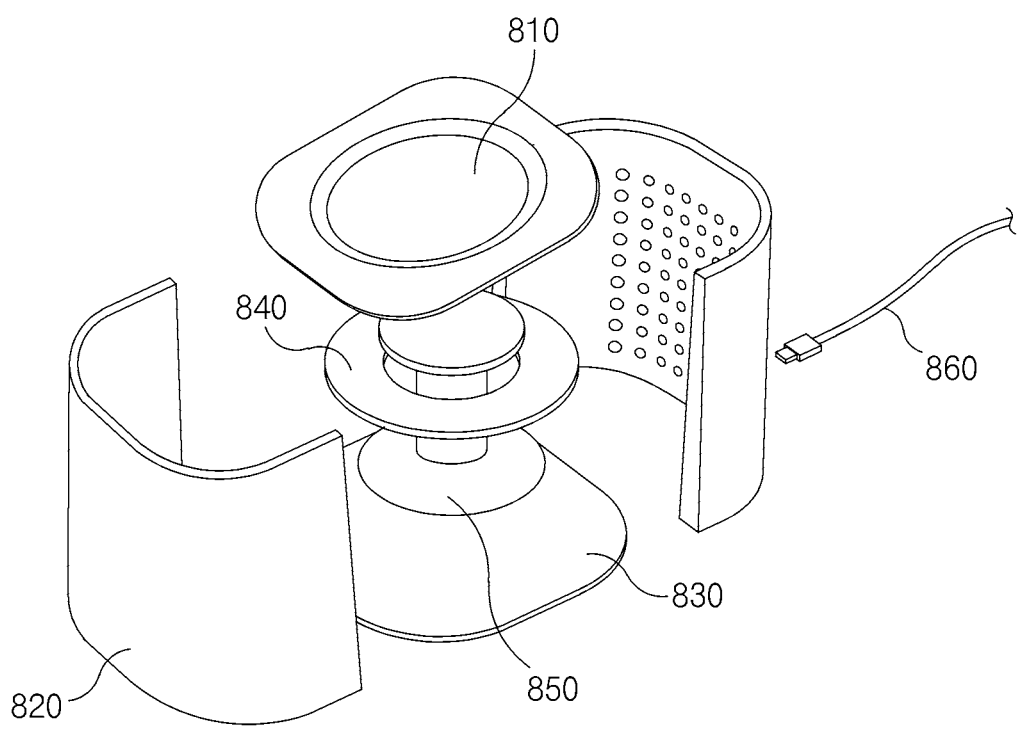
FIG. 16 is an exploded perspective view of a Bluetooth speaker according to another exemplary embodiment of the present disclosure.
Figure 17:
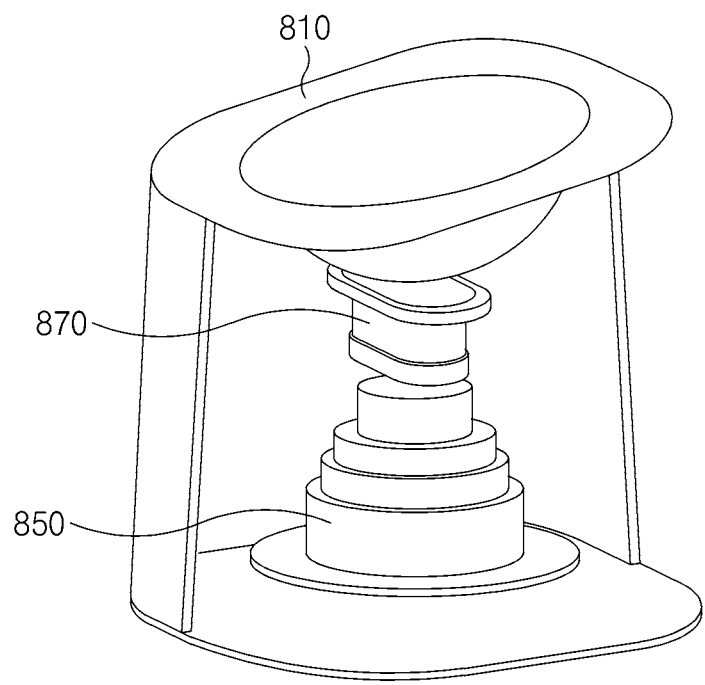
FIG. 17 is an assembled perspective view of a Bluetooth speaker according to another exemplary embodiment of the present disclosure.

FIG. 15 is a perspective view illustrating a Bluetooth speaker interworking mosquito repellent system according to another exemplary embodiment of the present disclosure. FIG. 16 is an exploded perspective view of a Bluetooth speaker according to another exemplary embodiment of the present disclosure. FIG. 17 is an assembled perspective view of a Bluetooth speaker according to another exemplary embodiment of the present disclosure.

The mosquito repellent system may include a mosquito repellent apparatus 100 and a Bluetooth speaker 800, which are connected using a short-range communication technology (e.g., Bluetooth).

An insert type holder 810 having a groove formed such that a lower portion of the mosquito repellent apparatus 100 is inserted and received may be included in an upper portion of the Bluetooth speaker 800.

A cover 820 may be disposed below the insert type holder 810. The cover 820 may be implemented as a mesh fabric. A space capable of accommodating a main PCB 840, a sub-woofer 850, a tweeter 870, and the like may be formed at an inner side of the cover 820. The sub-woofer 850 may output a low frequency.

A bottom stand 830 for forming a bottom surface may be provided at a lower end of the Bluetooth speaker 800.

A connecting terminal capable of connecting a cable 860 for data transmission and power supply may be formed at a one end of the cover 820 of the Bluetooth speaker 800.

Exemplary embodiments of the present disclosure may actively control power and/or sensitivity of an ultrasonic wave based on a mosquito appearance state, thus improving mosquito repellent performance.

Furthermore, exemplary embodiments of the present disclosure may operate lighting in a linked manner for each stage based on a mosquito appearance state, thus allowing the user to easily recognize the mosquito appearance state.

Furthermore, exemplary embodiments of the present disclosure may place ultrasonic transducers for every various radiation angles and may rotate a rotator on which the ultrasonic transducers are arranged, thus expanding a mosquito repellent effectiveness radius.

Furthermore, exemplary embodiments of the present disclosure may interwork with the vehicle to determine effectiveness of ultrasonic radiation with regard to states of a passenger and luggage and may provide an optimal mounting position, thus providing the user with convenience.

Furthermore, exemplary embodiments of the present disclosure may control ultrasonic power for mosquito repellent and may interwork with an air conditioning device to control the air conditioning device.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A mosquito repellent apparatus, comprising:
   a mosquito recognition device configured to detect a mosquito;
   an ultrasonic sensor configured to generate an ultrasonic signal; and
   a controller configured to:
   recognize mosquito appearance in a vehicle using the mosquito recognition device;
   determine a mosquito appearance stage based on a mosquito sound; and
   control power of the ultrasonic sensor based on the mosquito appearance stage;
   wherein the controller is further configured to determine an optimal mounting position of the mosquito repellent apparatus with regard to multiple reflections from a reflector in the vehicle if there is a mosquito repellant limit area at a current position of the mosquito repellent apparatus due to a power limit of the ultrasonic sensor.

2. The mosquito repellent apparatus of claim 1, wherein the controller is configured to variably control a frequency and a radiation pattern of the ultrasonic signal based on the mosquito appearance stage.

3. The mosquito repellent apparatus of claim 1, wherein the controller is configured to determine an output voltage and sensitivity of the ultrasonic signal based on the mosquito appearance stage.

4. The mosquito repellent apparatus of claim 1, wherein the controller is configured to change a lighting color based on the mosquito appearance stage.

5. The mosquito repellent apparatus of claim 1, wherein the controller is configured to:
   recognize mosquito population based on a frequency and a waveform of the mosquito sound;
   determine the mosquito appearance stage as stage 1 if the mosquito population is recognized as one; and
   determine the mosquito appearance stage as stage 2 if the mosquito population is recognized as two or more.

6. The mosquito repellent apparatus of claim 1, wherein the ultrasonic sensor comprises at least one ultrasonic sensor disposed for each radiation angle.

7. The mosquito repellent apparatus of claim 1, wherein the controller is configured to determine an output voltage and sensitivity of the ultrasonic signal based on a mounting position of the mosquito repellent apparatus and sound pressure output information of the ultrasonic signal for each position in the vehicle.

8. The mosquito repellent apparatus of claim 1, wherein the vehicle visualizes and outputs a mounting position of the mosquito repellent apparatus and sound pressure output information of the ultrasonic signal for each position in the vehicle.

9. The mosquito repellent apparatus of claim 1, wherein the controller is configured to radiate lighting to an ultrasonic radiation position.

10. A method for operating a mosquito repellent apparatus, the method comprising:
    recognizing mosquito appearance in a vehicle using a mosquito recognition device;
    determining a mosquito appearance stage based on a mosquito sound; and
    controlling power of an ultrasonic sensor based on the mosquito appearance stage;
    wherein the method further comprises determining an optimal mounting position of the mosquito repellent apparatus with regard to multiple reflections from a reflector in the vehicle if there is a mosquito repellent limit area at a current position of the mosquito repellent apparatus due to a power limit of the ultrasonic sensor.

11. The method of claim 10, wherein the controlling of the power of the ultrasonic sensor comprises:
    variably controlling a frequency and a radiation pattern of an ultrasonic signal radiated by the ultrasonic sensor based on the mosquito appearance stage.

12. The method of claim 10, wherein the controlling of the power of the ultrasonic sensor comprises:
    determining ultrasonic power and sensitivity of the ultrasonic sensor based on the mosquito appearance stage.

13. The method of claim 10, further comprising:
    controlling a lighting color based on the mosquito appearance stage.

14. The method of claim 10, wherein the determining of the mosquito appearance stage comprises:
    recognizing mosquito population based on a frequency and a waveform of the mosquito sound;
    determining the mosquito appearance stage as stage 1 if the mosquito population is recognized as one; and
    determining the mosquito appearance stage as stage 2 if the mosquito population is recognized as two or more.

15. The method of claim 10, further comprising:
    visualizing and outputting, by the vehicle, a mounting position of the mosquito repellent apparatus and sound pressure output information of an ultrasonic signal for each position in the vehicle.

16. The method of claim 10, further comprising:
radiating lighting to an ultrasonic radiation position of the ultrasonic sensor.

17. The method of claim 10, further comprising:
playing and outputting a mosquito repellent sound source through a speaker based on the mosquito appearance stage.

\* \* \* \* \*